Feb. 12, 1963 F. TURANCIOL 3,077,075
ROTARY RADIAL FLOW JET ENGINE
Filed March 15, 1957 5 Sheets-Sheet 3

INVENTOR.
FUAD TURANCIOL
BY
Reynolds, Beach & Christensen
ATTORNEYS

Feb. 12, 1963 F. TURANCIOL 3,077,075
ROTARY RADIAL FLOW JET ENGINE
Filed March 15, 1957 5 Sheets-Sheet 4

INVENTOR.
FUAD TURANCIOL
BY
Reynolds, Beach & Christensen
ATTORNEYS

Feb. 12, 1963   F. TURANCIOL   3,077,075
ROTARY RADIAL FLOW JET ENGINE
Filed March 15, 1957   5 Sheets-Sheet 5

INVENTOR.
FUAD TURANCIOL
BY
Reynolds, Beach & Christensen
ATTORNEYS 3,077,075
ROTARY RADIAL FLOW JET ENGINE
Fuad Turanciol, Seattle, Wash. (3205 Shorewood Drive, Apt. 119, Mercer Island, Wash.)
Filed Mar. 15, 1957, Ser. No. 646,359
7 Claims. (Cl. 60—39.35)

The present invention relates to a rotary radial flow jet engine of the type where air is supplied continually to a combustion chamber, the combustion is continuous and the thrust producing rotation also occurs continuously.

It is an object of the present invention to provide such a jet engine of simple construction and high efficiency which has only a single moving major part, namely, a rotor. Each of various components performs several useful functions.

Another object is to provide such an engine the operation of which will be very flexible in that it can be accelerated or decelerated rapidly in response to variations in power demand.

It is also an object to design such an engine which will be balanced accurately so that it will be substantially free from vibration at all rotative speeds and the gases will flow smoothly through the rotor without pulsation.

Such an engine is economical to manufacture and has long life. Its parts can be designed and arranged to be readily accessible for servicing or repair. The engine construction has the further advantages of compactness and light weight, contributing to a low weight-to-brake horsepower ratio.

A further object is to provide effective air cooling for the walls of such an engine, and heating of the walls may be reduced by ionization of the combustion gases.

As another object greater efficiency can be achieved by utilizing an after-burner in conjunction with the engine or in obtaining further mechanical work from the exhaust gases by providing a counter-rotating turbine encircling the engine rotor.

The objects and advantages discussed above can be achieved in an engine having a rotor including two disks spaced axially to define a combustion chamber between them and having air inlets in the central portions of the disks and peripheral combustion gas discharge outlets between blades arranged about the circumference of the rotor and inclined relative to radii of the rotor passing through them. These blades are shaped and located to form expansion nozzles directed generally tangentially of the rotor through which the combustion gas is discharged to produce a reaction rotating the rotor. Cover sheets form opposite sides of the rotor and are spaced from the combustion chamber disks by radiating vanes which define between the centrifugal blower passages. Air moving outward through such passages cools the combustion chamber wall disks and induces an axial flow of air toward the central portion of the rotor's opposite sides to facilitate supply of air to the combustion chamber.

The jet engine may be used for producing power for various purposes such as propelling vehicles or developing electric power, for example. The engine has only a rotor as its principal moving component and consequently it is necessary to mount the rotor suitably so that the engine can be anchored to a base or in a vehicle and its rotation can be harnessed mechanically, or the combustion gas which it develops can be used for supplying a jet thrust force, or the power developed can be utilized in both of these forms.

Figure 1:
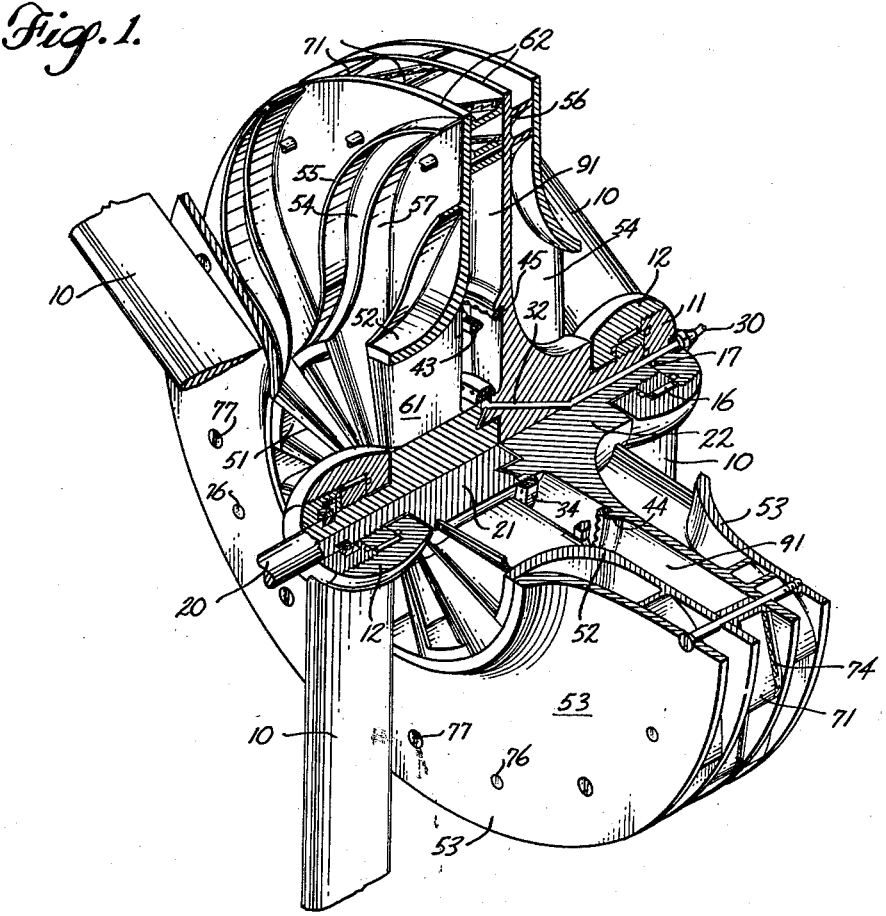
FIGURE 1 is a top perspective view of the engine with parts broken away to show internal structure.
Figure 2:
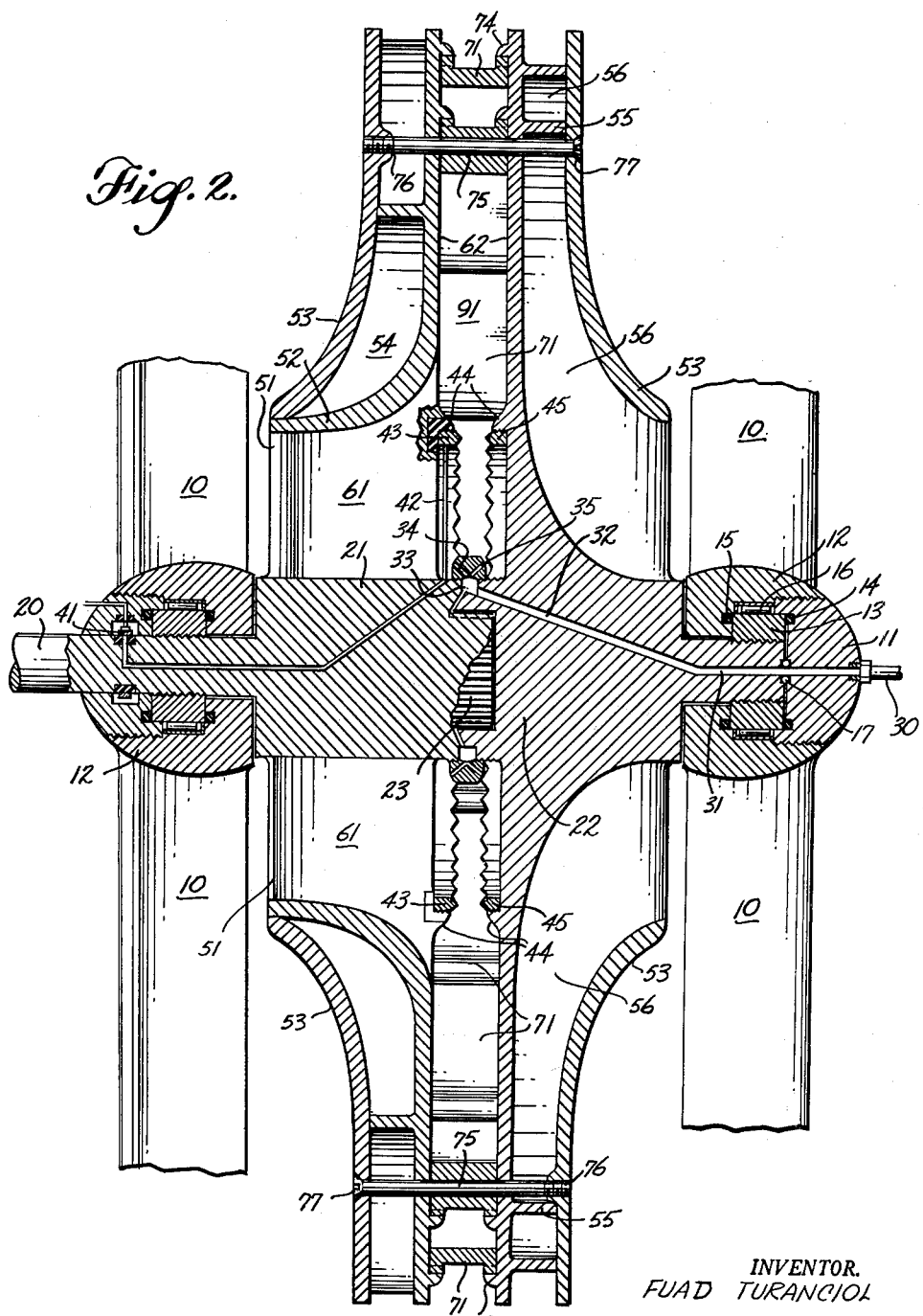
FIGURE 2 is a diametral sectional view through the engine parallel to the rotative axis.
Figure 3:
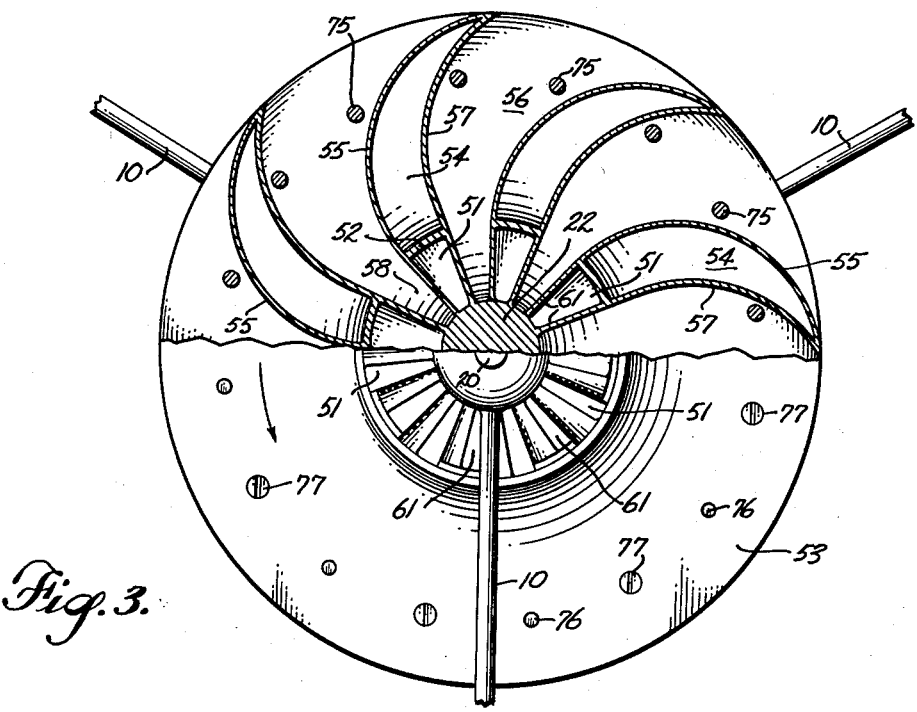
FIGURE 3 is a side elevation of the engine with part of a cover sheet broken away.

As illustrative of typical mounting structure struts 10 arranged at angles of 120 degrees are shown in FIGURES 1, 2 and 3 at opposite sides of the engine which may be suitably anchored to an engine base or to a vehicle in which the engine is installed. These struts constitute a spider support for each of the opposite ends of an axle assembly about which the engine rotor turns. The hub portions 11, 12 form the opposite ends of such axle assembly. The struts 10 radiate from the annular hub sections 12 and must be mounted so as to hold these hub sections firmly in precise axial alignment. The plugs 11 are threaded into the outer ends of the annular hub elements 12 to hold the rotor properly centered between such hub elements.

The engine rotor is arranged around a rotary two-part axle which rotates with the rotor and may incorporate a projection 20 extending through one of the hub plugs 11 to be used as a convenient mount for a power take-off pulley, gear, or other power absorbing rotary drive element. The axle includes two end sections 21 and 22 which are interconnected for conjoint rotation by interfitting projection and socket members having interengaged splines 23 shown in FIGURE 2. The outer end of each of the shaft sections 21 and 22 is reduced to fit the bore of a hub element 12 and such reduced shaft end is held in its hub element by a nut 13 screwed onto the reduced shaft end portion.

The radial and axial loads of the engine rotor are transmitted to the hub units by the axle parts 21 and 22 through the nuts 13. These nuts must therefore be secured suitably to the shaft ends and various well known expedients not shown, such as a castle nut and cotter pin construction, can be used for this purpose. The rotor will develop considerable centrifugal force but because of its balanced construction there will be no appreciable thrust force and the principal radial force exerted on the hub structure will be the weight of the rotor and the pressure of a gear drive or pull of a belt drive on shaft extension 20. To minimize friction, however, it is preferred that each nut be isolated from the hub structure in which it is received by antifriction bearings. A thrust ball bearing 14 is shown interposed between the outer face of each nut 13 and the hub plug element 11 and a thrust ball bearing 15 interposed between the inner face of nut 13 and the annular hub element 12. The radial loads are carried by radial roller bearing 16 located between the nut 13 and the annular hub element 12.

When the rotor parts have been assembled and the end portions of the rotor shaft parts 21 and 22 have been inserted in the mounting hub elements 12, the bearings 15 and 16 can be inserted into these hub elements and the nuts 13 tightened until the rotor fits snugly but freely between the hub members. The nuts are then suitably secured to the shaft projections in such adjusted positions and the hub plug elements 11 in which the bearings 14 are mounted are screwed into the hub elements 12 until the bearings 16 are secured in place and the bearings 14 are moved substantially into engagement with the nut.

The hub parts may then be locked together in any suitable manner.

The rotor mounted on the axle 21, 22 houses the combustion chamber which consequently is rotary. It is therefore necessary to supply fuel to the combustion chamber through the rotor shaft. The fuel passage is shown in FIGURES 1 and 2 as extending through the axle part 22. A stationary fuel pipe connection 30 is secured to the hub plug element 11 and passes through a passage in it into an axial passage 31 formed concentrically in the shaft reduced end portion. In order to be delivered through the periphery of the shaft's central portion the axial passage 31 communicates with several outwardly inclined passages 32 which open substantially at the central portion of the shaft's periphery in an annular groove 33 formed between the two shaft parts. These shaft parts may be held against axial movement by an interconnecting nut 34 covering this groove in addition to the function of the thrust bearings 14 and 15 in preventing axial movement of the shaft parts.

The combustion chamber 91 is of annular shape, being located between axially-spaced disks 62, and hence expands radially. Fuel can flow from the annular groove 33 into such combustion chamber through the small holes 35 drilled in the nut 34 which serve to atomize the fuel very finely. Air must of course be supplied to support the combustion of the fuel and such air is supplied through air passages 51 extending axially into the central portion of the rotor from both sides and spaced circumferentially in the opposite sides of the rotor so that the air inlets in the opposite sides of the rotor are staggered circumferentially as indicated in FIGURES 1 and 2.

The air inlets 51 are formed by radial spokes 61 which connect the disks 62 spaced axially of the rotor to the shaft parts 21 and 22, respectively, and peripheral walls 52 curved from axial openings to merge with the disks 62, as shown in FIGURE 2. Outer cover sheets 53 at each side of the rotor extend from the peripheral inlet walls 52 to the outer edges of the disks 62. Between the cover sheet 53 and the disk 62 are radiating vanes which taper in axial width toward their outer ends. The space 54 between such vanes converges generally radially outward so that the grooves 56 between the air passages 51 flare outward circumferentially from the throat 58 located between adjacent combustion chamber air inlets 51. The cover sheets 53 may be mounted on the vanes 55 and 57 to rotate with the rotor or be mounted stationarily on the struts 10 as preferred.

Preferably the vanes 55 and 57 curve outwardly and rearwardly with reference to the direction of rotation of the rotor, so that the radially outer portions of the spaces between them are swept in the direction opposite the direction of movement of the marginal portions of the disks during rotation of the rotor. As the rotor turns these vanes function as centrifugal blower impellers to draw air axially of the rotor into the throats 58 and throw such air outwardly through the circumferentially flaring grooves 56. Such movement of air into the groove throats 58 induces an air current flowing into the combustion chamber supply passages 51 between the throats 58. In addition the spokes 61 function as short centrifugal blower vanes tending to accelerate the flow of air radially outwardly along the curving surface of wall 52 so as to initiate outward flow in the combustion chamber 91 between the disks 62.

As the air entering the inlets 51 sweeps radially outward between the disks 62 it picks up fuel sprayed into the combustion space from the orifices 35 in nut 34. In order to burn this fuel continuously fuel igniting means, such as a continuous spark discharge, may be provided in the combustion chamber. A brush 41 supplies electric current from a suitable source to a commutator ring carried by the shaft part 21 connected to a conductor wire 42. The brush is suitably insulated from the hub plug 11 in which it is mounted and the commutator ring and conductor 42 are also insulated from the hub assembly and shaft part 21. This wire is connected to a spark ring 43 in the form of a nut screwed onto threaded shoulders 44 on the spokes 61 so that it can be unscrewed for replacement. A cooperating grounded spark ring 45 is removably mounted on similar shoulders 44 on the spokes of the opposite disk 62. These rings have axially-projecting points in axial registry between which sparks jump across the combustion chamber.

Around the periphery of the combustion chamber 91 and extending axially to bridge the gap between the side disks 62 forming the combustion chamber are spaced blades 71. Each of these blades extends chordwise of the disks 62 and each of them is approximately one-half a chord in length. Thus each blade extends substantially from a radius through the center of the chord in which it lies rearwardly in the direction of rotation of the rotor indicated by the arrow in FIGURE 4 to the peripheries of the rotor disks 62. Preferably these blades taper substantially from their leading inner ends toward their trailing outer ends and have a cross-section of bulbous configuration in their leading portions.

The blades 71 are of sufficient length and are arranged close enough to each other so that the blades overlap to a considerable degree. In fact, as shown, it is preferred that the leading edge of each blade be located adjacent to but spaced from the central portion of the blade next ahead. The bulbous shape of each blade's leading portion serves two principal functions, first that of providing cooperating surfaces of adjacent blades to form nozzle-shaped passages between them and second to afford a cavity or hollow 72 in the inner end of each blade. The aggregate minimum cross-sectional area of all the nozzle passages is a minor portion of the circumferential area of the space between disks 62 adjacent to the nozzles. Since the leading end of each blade extends farthest into the combustion chamber 91 it will be subjected to the greatest heat and consequently requires the most cooling. A cooling medium, such as sodium, can be provided in the hollow 72 of each blade to facilitate conduction of heat from the central portion of the blade to the side disks 62 of the combustion chamber from which the heat will be removed by the air flowing over the outer surfaces of such disks through the passages 56 described previously.

Figure 6:
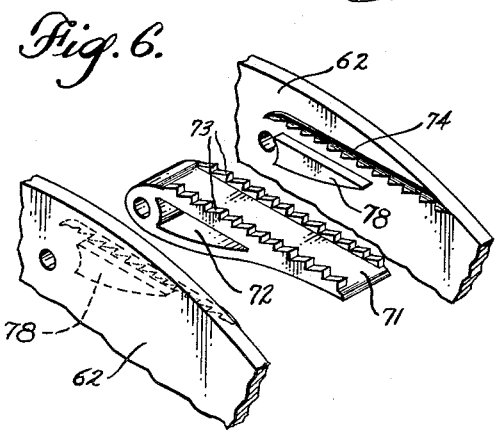
FIGURE 6 is an exploded top perspective view of a blade and fragmentary alternative blade mounting.

Each of the blades 71 is held in place by teeth 73 arranged along the opposite edges of its outer side which fit into complemental notches in the inner sides of ribs or cleats 74 projecting laterally from the peripheral portions of the combustion chamber disks 62. These ribs extend chordwise of the disks in the proper positions to locate the blades 71 properly. The blades are secured in position by bolts 75 extending through axial bores in their leading inner ends which connect such blades to the disks 62. As shown best in FIGURE 2 these bolts further extend through the outer cover sheets 53 near their peripheries so as to bind together at intervals closely spaced peripherally the entire rotor structure. Each bolt 75 is illustrated as having a threaded end screwed into a hole 76 tapped in one of the cover sheets 53 while the hole 77 in the other cover sheet 53 is countersunk to receive the head of a bolt 75. Threaded holes 76 may alternate with countersunk holes 77 around each cover sheet 53 so that alternate bolts will be engaged in the holes of the cover sheets and disks 62 from opposite sides of the rotor. As shown in FIGURE 6 the blades may be additionally anchored by lugs 78 projecting from disks 62 to fit into the opposite ends of the blade cavities 72.

Figure 4:
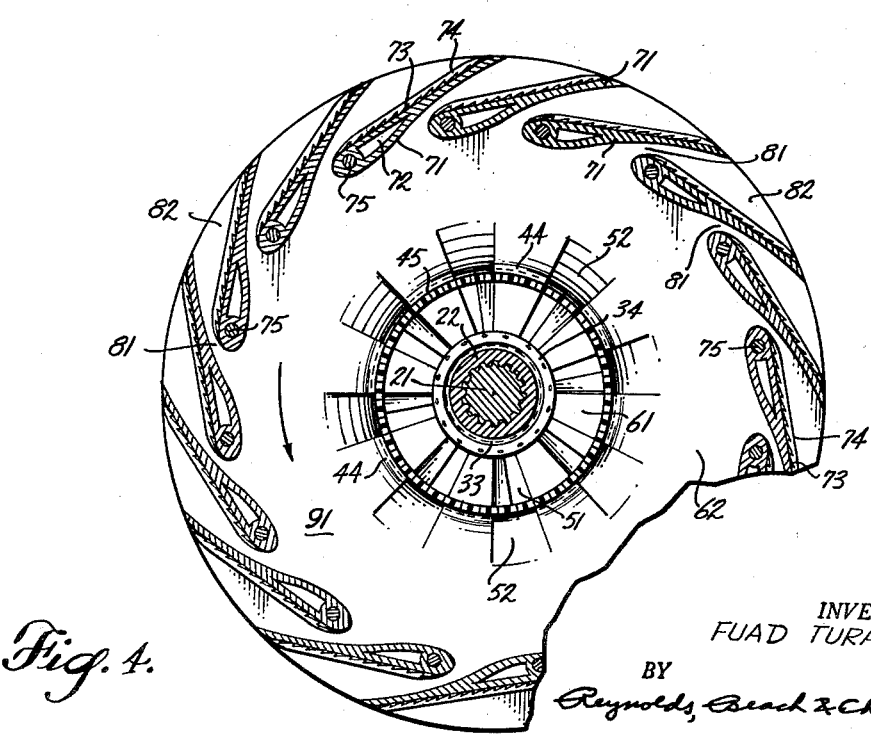
FIGURE 4 is a central sectional view through the engine taken perpendicular to its axis of rotation, a portion of the engine being broken away.

It will be noted from FIGURE 4 that the shape of the blades and their arrangement as described forms between the leading inner end of each blade and the central portion of the blade next ahead in the direction of rotation of the rotor a venturi nozzle throat, whereas the angle between the chords on which the adjacent blades lie forms a flaring nozzle exit 82. As the combustion gases burn in the combustion chamber 91 they expand and the air moving into the combustion chamber through the inlet passages 51 urges the expanding gases to move toward the periphery of the rotor. Inwardly of the peripheries of disks 62 the rotor is principally closed by the bulbous inner leading ends of the blades 71.

The only exits for the outwardly moving combustion gases are the narrow nozzle throats 81. Consequently, the inner ends of the blades tend to obstruct movement of the combustion gases so that they are retained in the combustion chamber to prolong the combustion period and thus increase the completeness of the combustion. As the combustion gases continue to burn their pressure will increase at the entrances to the nozzles and the velocity of gas flow through the nozzles will be high. The nozzle outlets 82, it will be noted in FIGURE 4, are directed substantially tangentially of the rotor. The nozzles therefore convert movement of the combustion gases from generally radially outward paths in the combustion chamber to substantially tangential paths. The outwardly moving combustion gases will of course move somewhat rearwardly in the direction of rotation of the rotor because of its rotation but the nozzles between the blades will turn the movement of the combustion gases through a substantial angle.

Figure 8:
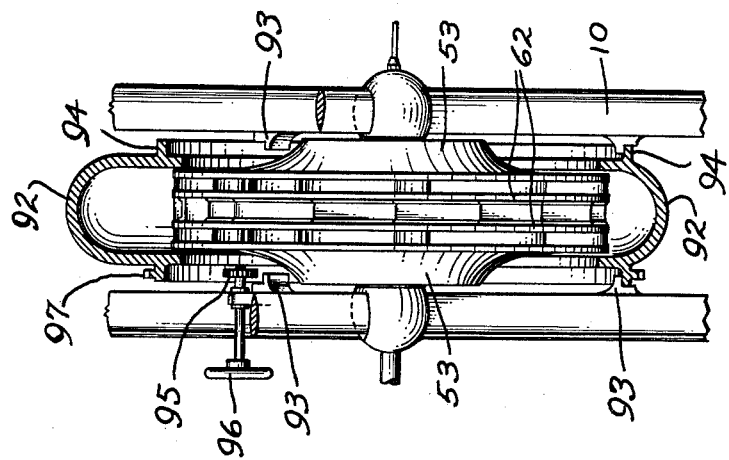
FIGURE 8 is an edge elevation of such engine with part of the casing broken away.
Figure 7:
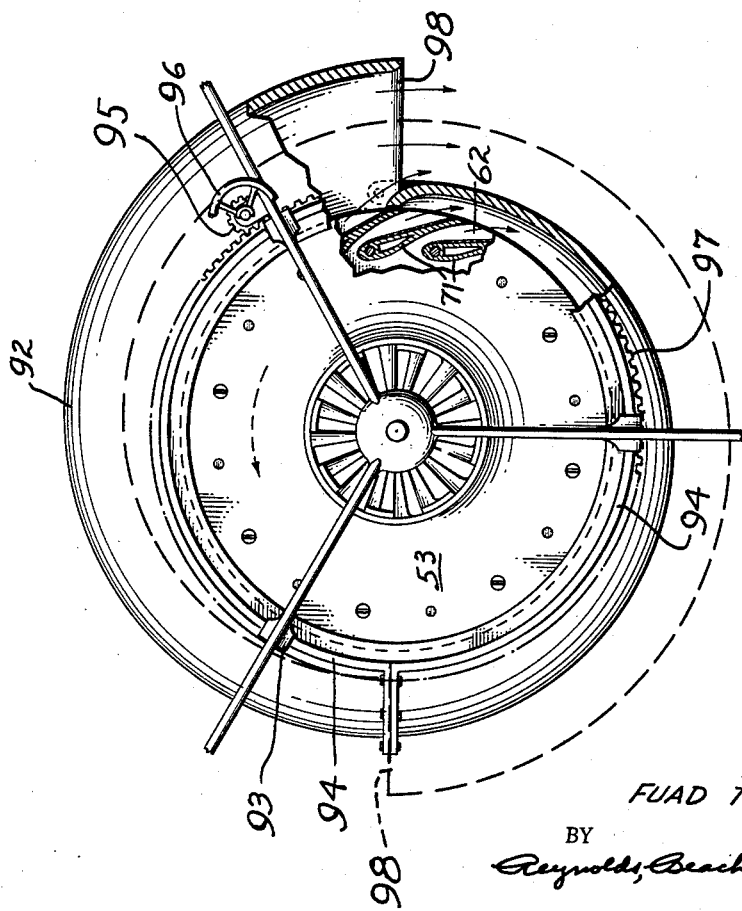
FIGURE 7 is a side elevation with parts broken away of an engine including an exhaust jet casing.

Discharge of the combustion gases generally tangentially from the periphery of the rotor will produce a reaction causing rotation of the rotor in the direction indicated by the arrow in FIGURE 4. A suitable casing can be provided to shroud the periphery of the rotor so that the combustion gases thus discharged from the rotor's periphery may be further utilized for jet propulsion purposes either with or without an afterburner. Such a casing 92 shown in FIGURES 7 and 8 may be suitably supported by lugs 93 on the struts 10 engaging annular ribs 94 on the casing. The casing progressively increases circumferentially in radial width to a single jet opening 93 directed tangentially of the rotor and may be turned relative to the supporting spokes by a pinion 95 rotated by a control wheel 96 and meshing with a ring gear 97 on a rib 94 to direct the jet opening in any direction desired for propulsion. Such jet may, for example, be used to exert propulsion force in one direction when the casing is in the full line position and the casing can be turned 180 degrees to the broken line position of FIGURE 7 in which the jet will produce a braking thrust.

Figure 5:
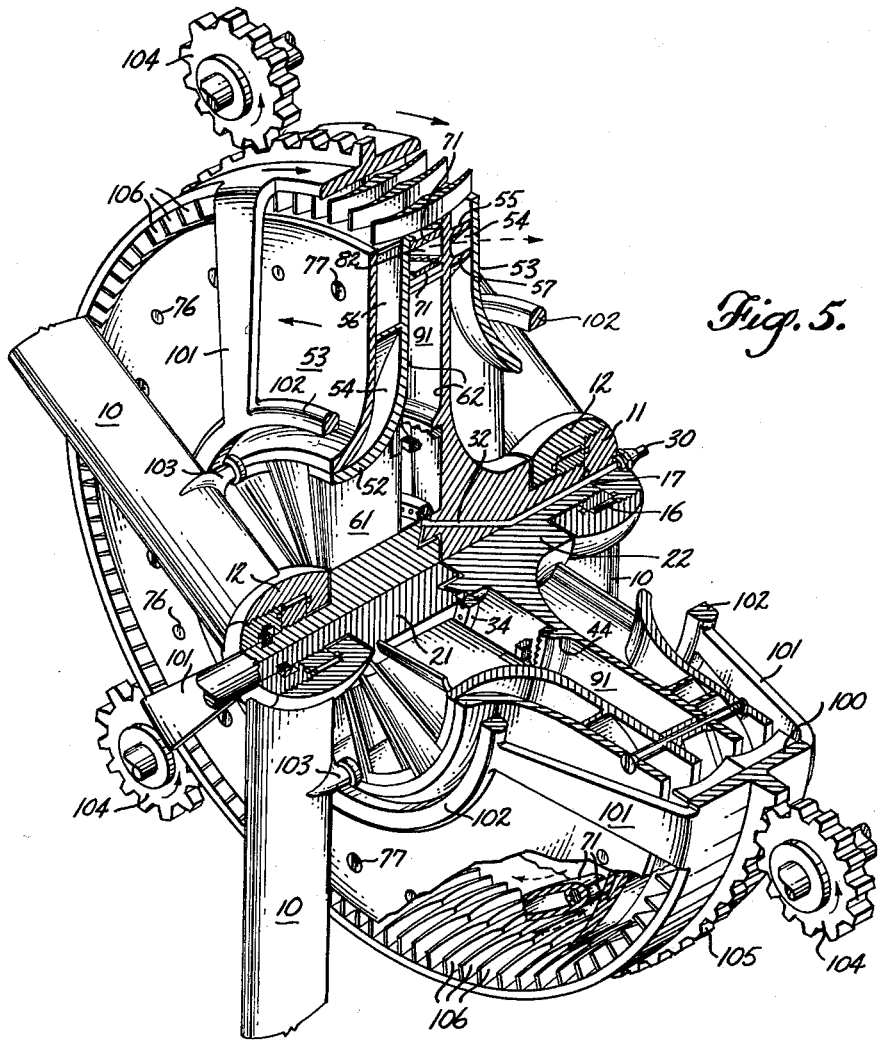
FIGURE 5 is a top perspective view of a modified form of the engine with parts broken away.

FIGURE 5 illustrates a modified type of construction for extracting additional mechanical energy from the combustion gas discharged from the rotor's periphery. A ring 100 is supported by arms 101 from a mounting ring 102 bearing on projections 103 on struts 10, respectively. These projections are in positions on such struts which locate the rings 102 and 100 concentrically relative to the axis about which the rotor turns. The ring 100 may further be located by satellite gears 104 arranged in circumferentially spaced relationship around the ring 100 and meshing with the external ring gear 105 carried by the ring 100.

On the inner periphery of ring 100 are blades 106 disposed generally in radial planes and closely spaced circumferentially of the ring. Each blade is of narrow width radially of the rotor and has an axial length several times as great as its radial width. Combustion gases discharged from the nozzle outlets of the rotor will impinge upon the blades 106 and exert a force on them to turn the ring 100 in the direction opposite the direction of rotation of the rotor. In order to facilitate discharge of the combustion gases from the spaces between blades 106 with the least turbulence the trailing face of each blade preferably is formed in the shape of a ceratoid cusp. The angular ridge extending radially of such blade face will divide the combustion gas so that it will be discharged from the space between the rotor and ring 100 in portions moving in opposite axial directions. The leading face of each blade 106 in the direction of ring rotation may be curved arcuately about a radial axis.

It will be evident that, as the gas discharged from the rotor nozzles impinges against the blades 106 to rotate ring 100 in a direction opposite to the direction of rotor rotation the ring gear 105 will drive the satellite gears 104. These satellite gears can be interconnected suitably to a second drive shaft disposed concentrically of the engine and at the side opposite the rotor's power shaft projection 20, or such satellite gears may be integrated with the axle projection power shaft 20 by suitable gearing for conjoint rotation if desired. In either event provision of the additional ring 100 will convert more of the combustion energy in the exhaust gas into rotary mechanical energy.

In either type of rotor the heat of the combustion gas will tend to produce a high temperature both in the blades 71 and in the rotor disks 62. The heat from the blades will be conducted to the rotor disks as explained previously and the air flowing through the grooves 56 between the cover sheet at each side of the engine and the adjacent disk 62 will extract heat from the disk to cool it. The air thus expanded by the heat removed from the disks will be discharged from the periphery of the rotor in a generally tangential direction opposite to the direction of rotor rotation to supplement the reaction thrust produced by discharge of the combustion gases.

The temperature rise of the rotor disks 62 can be curtailed if the transfer of heat from the combustion gas to the disks can be reduced. Such transfer is effected by contact of the gas with the blades 71 and disks 62 principally. An expedient for reducing such contact to some extent will result from the arcing between the points on spark rings 43 and 45 described previously. These rings will be of opposite electrical polarity to produce the spark and in order to obtain the desired cooling effect the commutator ring will be energized by a brush 41 connected to the positive terminal of a direct current source. This commutator ring will be insulated both from the vehicle and from the engine. Likewise the spark ring 43 is mounted on shoulders insulated from the spokes 61.

The ring 45 on the contrary is mounted on shoulders grounded to the rotor and the rotor in turn will be connected to the negative terminal of the direct current power source so that the disks 62 at opposite sides of the combustion chamber and the blades 71 will carry a negative charge. The spark produced by passage of the electric current between rings 43 and 45 through the combustion gas and great excess of air mixed with it will produce negative ionization of a portion of such gas and air and particularly of the oxygen content. The negatively charged gas particles will be repelled by the negative charge on the disks 62 and blades 71 so as to prevent direct contact between them. The reduction in contact of the gas with the combustion chamber walls and blades thus produced will deter transfer of heat from the gas to these metal parts of the rotor so that less cooling of these rotor parts will be required.

It is believed that the manner in which the engine operates will be evident from the foregoing description. Rotation of the rotor may be started by any suitable driving connection to the hub extension 20. Such rotation will cause the vanes 55 and 57 between the combustion chamber disks and the cover plates to blow air outwardly and thus induce an axial current of air into the inlet passages 51 in opposite sides of the rotor leading to the combustion chamber 91. Such air entering the passages 51 will be accelerated radially outwardly in the combustion chamber by the blades 61. If fuel is sprayed into such outwardly moving air from the small apertures 35 and sparks are produced between the points of the rings 43 and 45, combustion of the fuel will occur causing the gas in the combustion chamber to be heated and to expand.

Because additional air will be flowing into the rotor through the inlets 51, the gas in the combustion chamber will continue to move toward its periphery. The air and atomized fuel will be mixed thoroughly by the churning of the spokes 61 promoting uniformity of combustion and the combustion will be prolonged by the obstruction to discharge of the combustion gas through the rotor periphery between the blades 71. As the combustion gases are discharged through the nozzles formed between adjacent blades the direction of combustion gas flow will be diverted from a generally radially outward direction to a generally tangential direction opposite to the direction of rotor rotation which will continue rotation of the rotor and the blower action of the vanes 55 and 57.

The faster the rotor turns the more air will be moved outward by the vanes 55 and 57 and consequently the stronger will be the current of air moving through the inlet passages 51 into the combustion chamber. Although the resulting increase in combustion and resultant expansion of the gas in the combustion chamber will tend to cause the air in the combustion chamber to move outward through the air inlets 51, the increased inward axial flow will oppose such tendency so that the result will be that the gas will flow more rapidly through the discharge nozzles between the blades 71 thus increasing the propulsive effect on the rotor.

With such an increase in combustion in the combustion chamber the combustion chamber walls 62 and blades 71 will also tend to become heated more highly but the cooling action of the air sweeping radially outward through the spaces 56 will be increased correspondingly to extract heat from the rotor disks 62 and thus deter a rise in temperature of these walls. The speed which the rotor will attain will of course be governed by the amount of fuel supplied through conduit 30 and ducts 31 and 32 to the discharge orifices 35 and the work load placed on the engine. In order to provide sufficient air for combustion, however, it is important that the load imposed on the engine not be so great as to slow down the rotor sufficiently to prevent an adequate supply of air being impelled into the combustion chamber through the inlets 51 by the combined action of the blower vanes 57 and the spokes 61.

I claim as my invention:

1. A rotary radial flow jet engine comprising a rotor including two disks rotatable about a common axis and spaced axially thereof for defining a combustion chamber therebetween, said rotor having a first air inlet to the combustion chamber between said disks, means supplying fuel to the combustion chamber between said disks, said disks having between them a plurality of discharge ports arranged around said disks for discharge of combustion gas therethrough from the combustion chamber between said disks in a direction generally tangentially of said disks and opposite to the direction of movement of the peripheries of said disks during rotation of said rotor, and centrifugal blower means at the side of each disk remote from the combustion chamber and the other disk, rotatable with said disks about the axes thereof for supplying cooling air to cool the sides of said disks opposite the combustion chamber and including a second air inlet alongside said first air inlet and opening adjacent to and in the same direction as said first air inlet for inducing flow of air into said first air inlet by movement of air into said second air inlet.

2. The rotary radial flow jet engine defined in claim 1, in which several first air inlets to the space between the disks are provided in each side of the central portion of the rotor, spaced apart circumferentially and opening axially of the rotor, and several second air inlets at opposite sides of the rotor's central portion are disposed between said several first air inlets in alternate arrangement therewith, each opening axially of the rotor and adjacent to one of said first air inlets.

3. A rotary radial flow jet engine comprising a rotor including two disks rotatable about a common axis and spaced axially thereof, means supplying fuel and air to the space between said disks, said disks having a plurality of discharge ports arranged around said disks for discharge of combustion gas therethrough from the space between said disks in a direction generally tangentially of said disks and opposite to the direction of movement of the peripheries of said disks during rotation of said rotor, and a plurality of generally radiating vanes projecting axially away from the side of each disk remote from the other disk, the spaces between adjacent vanes flaring radially outwardly to a greater extent than the divergence of radii passing through the radially inner ends of said vanes, and said vanes tapering in axial extent toward their outer ends.

4. A rotary radial flow jet engine comprising a rotor including two disks rotatable about a common axis and spaced axially thereof, means supplying fuel and air to the space between said disks, said disks having a plurality of discharge ports arranged around said disks for discharge of combustion gas therethrough from the space between said disks in a direction generally tangentially of said disks and opposite to the direction of movement of the peripheries of said disks during rotation of said rotor, and a plurality of generally radiating vanes projecting axially away from the side of each disk remote from the other disk, the radially outer portions of said vanes being swept in the direction opposite the direction of movement of the marginal portions of said disks as said rotor rotates.

5. A rotary radial flow jet engine comprising a rotor having an air inlet in the central portion thereof, a combustion space extending radially outwardly from said air inlet, and a plurality of nozzles arranged around the periphery for discharge of combustion gas therethrough generally tangentially of said rotor in the direction opposite to the direction of movement of the periphery thereof during its rotation, stationary supporting means mounting said rotor for rotation, an annular gas collector casing encircling said rotor and having an open inner periphery receiving exhaust gas from said nozzles, said casing having at one end thereof a jet propulsion discharge aperture directed generally tangentially of said rotor, and means supporting and guiding said gas collector casing for circumferential shifting relative to said stationary supporting means about the axis of said rotor to alter the position and direction of said casing's jet propulsion discharge aperture circumferentially of said rotor.

6. A rotary radial flow jet engine comprising a rotor including two disks rotatable about a common axis and spaced axially to define a combustion chamber therebetween, a spark ring disposed between, rotatable with and arranged generally concentrically of said disks, a cooperating member adjacent to but spaced from said spark ring for producing an electric spark between said spark ring and said cooperating member to ignite fuel in such combustion chamber, and means supplying fuel and air to the combustion chamber between said disks at a location inwardly of said spark ring, said disks having a plurality of discharge ports arranged around said disks outwardly of said spark ring for discharge of combustion gas from the combustion chamber in a direction generally tangentially of said disks and opposite to the direction of movement of the peripheries of said disks during rotation of said rotor.

7. The rotary radial flow jet engine defined in claim 6, in which the spark ring is carried by and insulated from one of the disks and has points projecting toward the other disk, and the cooperating member is a second spark ring carried by such other disk in registry with the first spark ring, grounded to such other disk and having points projecting toward the first spark ring.

(References on following page)

References Cited in the file of this patent

UNITED STATES PATENTS

| | | | |
|---|---|---|---|
| 930,359 | Diehl | Aug. 10, | 1909 |
| 1,003,708 | Coleman | Sept. 19, | 1911 |
| 1,263,475 | Shepard | Apr. 23, | 1918 |
| 1,868,143 | Heinze | July 19, | 1932 |
| 2,156,921 | Moody | May 2, | 1939 |
| 2,188,128 | Armstrong | Jan. 23, | 1940 |
| 2,448,972 | Gizara | Sept. 7, | 1948 |
| 2,548,092 | Bartlett et al. | Apr. 10, | 1951 |
| 2,551,111 | Goddard | May 1, | 1951 |
| 2,659,198 | Cook | Nov. 17, | 1953 |
| 2,670,597 | Villemejane | Mar. 2, | 1954 |
| 2,696,364 | Bartlett et al. | Dec. 7, | 1954 |
| 2,765,414 | Gendler | Oct. 2, | 1956 |

FOREIGN PATENTS

| | | | |
|---|---|---|---|
| 547,539 | France | Sept. 25, | 1922 |
| 887,436 | France | Aug. 16, | 1943 |
| 934,755 | France | Jan. 19, | 1948 |
| 585,333 | Great Britain | Feb. 5, | 1947 |